Feb. 14, 1961  E. K. KINTNER  2,971,453
MILK TREATING SYSTEM WITH DEAERATOR
Filed April 12, 1957  2 Sheets-Sheet 1

INVENTOR.
Edwin K. Kintner
BY Emery, Whittemore,
Dundore & Dix
ATTORNEYS

Feb. 14, 1961   E. K. KINTNER   2,971,453
MILK TREATING SYSTEM WITH DEAERATOR
Filed April 12, 1957   2 Sheets-Sheet 2
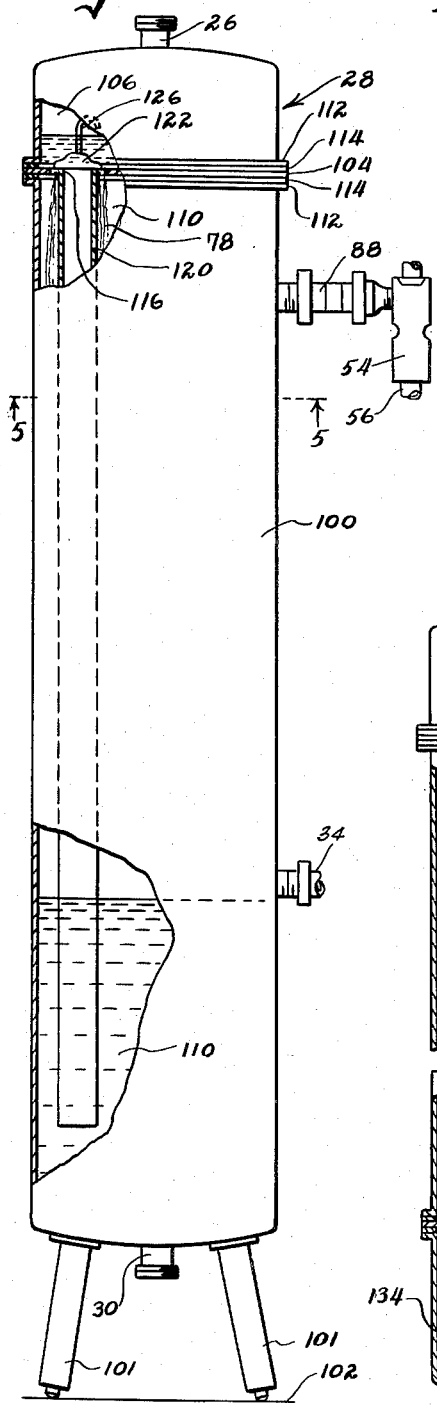
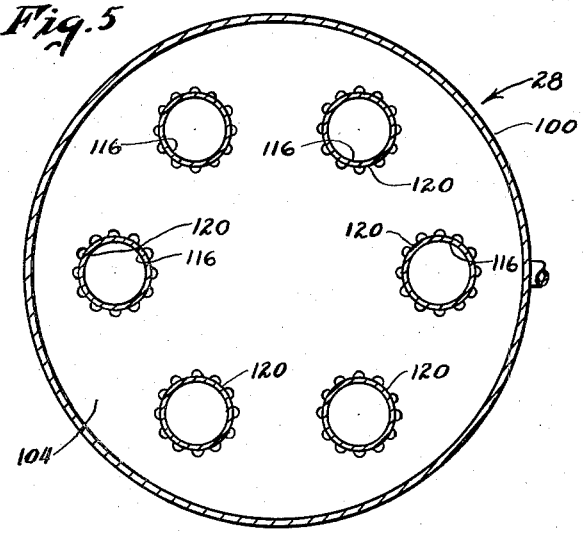
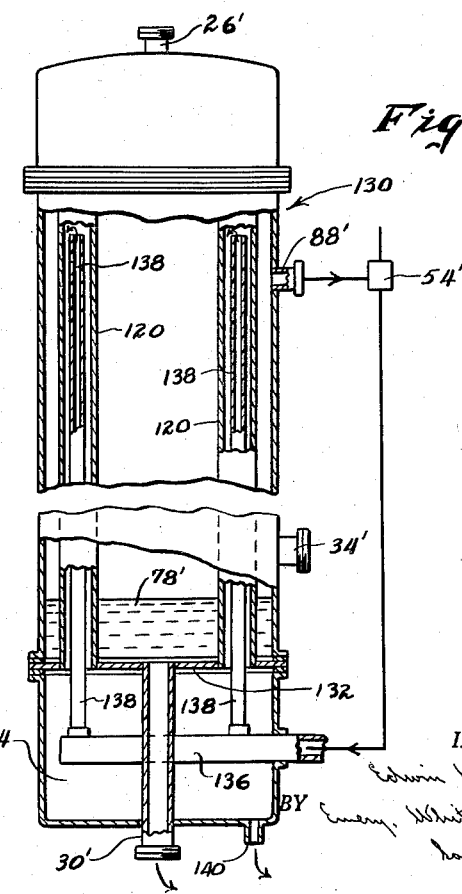
INVENTOR.
Edwin K. Kintner
BY
ATTORNEYS

United States Patent Office 2,971,453
Patented Feb. 14, 1961

2,971,453

MILK TREATING SYSTEM WITH DEAERATOR

Edwin K. Kintner, Johnstown, Pa., assignor to Sanitary Manufacturing Company of Pittsburgh, Pittsburgh, Pa., a corporation of Pennsylvania Filed Apr. 12, 1957, Ser. No. 652,478

11 Claims. (Cl. 99—252)

This invention relates to apparatus used for treating milk at elevated temperatures, and more especially to apparatus for deaerating the milk.

In modern milk-treating plants it is the practice to subject the milk to a partial vacuum, while heated, to remove air and other vapors from the milk. This is desirable for a number of reasons. One is that gaseous odors are sometimts liberated in the milk as the result of the heating necessary for pasteurizing. Another is that air or other gas interferes with the operation of homogenizers. The air in the milk decreases the capacity of the homogenizer and prevents the pumping up to full pressure in the homogenizer and the proper absorbing of heat from the compressor. Also air in the milk causes vibration in the homogenizing equipment.

Gas in the milk has the other disadvantage of causing precipitation in the regenerator because the flow is not in a steady stream. This precipitation often requires hand cleaning in order to remove it.

Deaerating of the milk is also desirable for removing objectionable flavors, including onion and other feed flavors resulting from particular items in the cow's diet.

It is an object of this invention to provide an improved milk-treating system in which the milk is deaerated. More particularly, it is an object of the invention to provide a vacuum chamber in which heated milk flows in thin films with large surface areas exposed to the reduced pressure and with no splashing or foaming of the milk. One modification provides a vacuum heater for the milk, in which the milk is heated by steam, but in which no steam comes in contact with the milk.

Another object of the invention is to provide a vacuum heater that can be substituted for the final heater in a conventional H.T.S.T. (high temperature, short time) milk system. Still another object is to provide a deaerator that controls the milk level. Health authorities require a constant level ahead of the homogenizer, and that there be no variations in pressure.

Other objects, features, and advantages of the invention will appear or be pointed out as the description proceeds.

In the drawing, forming a part hereof, in which like reference characters indicate corresponding parts in all the views:

Fig. 4 is a side elevation on an enlarged scale, of the deaerator shown in Fig. 1, with parts of the shell broken away and parts of the interior structure shown in section;

Fig. 5 is a greatly enlarged sectional view taken on the line 5—5 of Fig. 4; and Fig. 6 is a vertical view, mostly in section, of a modified form of deaerator which serves as a vacuum heater.

Figure 1:
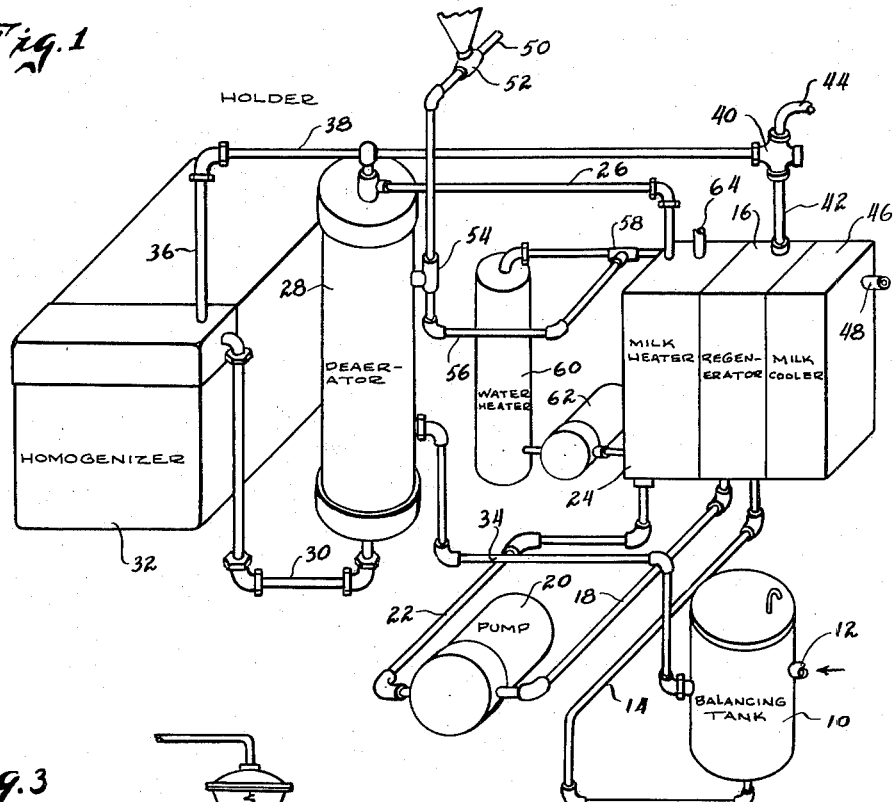
Figure 1 is a diagrammatic isometric view showing a high temperature, short time, pasteurizing and homogenizing equipment including the deaerator of this invention.

The milk-treating system shown in Figure 1 includes a balancing tank 10 into which cool, raw milk flows through an inlet pipe 12. Milk is drawn from the bottom of the balancing tank 10, through piping 14 to a regenerator 16 where heat from homogenized and pasteurized milk is transferred to the raw milk; the regenerator 16 constituting a heat exchanger with counter flow of the heated and cool milk flow in opposite directions. Such heat exchangers are well known and no further illustration or description of the regenerator is necessary for a complete understanding of this invention.

Milk is drawn through the regenerator 16 and through piping 18 by a positive displacement pump 20. The milk is discharged by the pump 20 through piping 22 to a heater 24 where hot water is used to heat the milk further, usually to a temperature of about 170° F.

From the heater 24 the milk passes through piping 26 to the upper end of a deaerator 28. The normal discharge of milk from the deaerator 28 is through piping 30 to a homogenizer 32, but overflow from a predetermined level of the deaerator flows through an overflow pipe 34 back to the balancing tank 10 where the overflow milk starts its flow through the system from the beginning.

The homogenizer 32, being another well-known piece of milk treating equipment need not be further illustrated or described. For purposes of this invention it is sufficient to understand that the homogenized milk is discharged through a pipe 36 to a holder 38 along which the milk flows at a temperature of 161° F. or higher. The holder 38 is long enough, in proportion to the rate of milk flow, to require a period of 15 seconds for the milk flow from one end of the holder 38 to the other. This insures that the milk is fully pasteurized, provided the temperature is maintained.

At the downstream end of the holder 38 there is a heat-responsive "safety valve" 40 which permits the milk to flow through a pipe 42 into the regenerator 16 as long as the milk reaching the valve 40 is at or above pasteurizing temperature. If or when milk reaching the heat-responsive valve 40 is below pasteurizing temperature, then the valve 40 shuts off flow of milk to the regenerator and diverts it through a pipe 44 to start over again its cycle through the milk treaing system. This heat-responsive safety valve is another piece of standard equipment for milk treating plants, and no further description of it is necessary for a complete understanding of the present invention.

The heated milk from the regenerator 16 gives up much of its heat to the incoming raw milk, as previously explained; and from the regenerator 16 the milk flows through a cooler 46 where its temperature is further lowered before the milk is discharged into a delivery line 48.

Steam from a steam supply line 50 is controlled by a diaphragm-operated valve 52. Steam is supplied from the valve 52 to a vacuum jet 54 connected to the vapor space within the deaerator 28 for withdrawing air and vapors from the deaerator and for maintaining a low pressure within the deaerator to cause the air and vapors to be drawn out of the milk.

The steam, with entrained air and vapors, passes through a line 56 to a fitting 58 when the steam is entrained in a water stream flowing from the milk heater 24 to a water heater 60. The condensation of the steam in the water heats the water; and the water is circulated through the milk heater 24 and water heater 60 by a water pump 62. A vent 64 from the water line at the milk heater permits the escape of air and other uncondensable vapors that are carried into the water with the steam.

Figure 2:
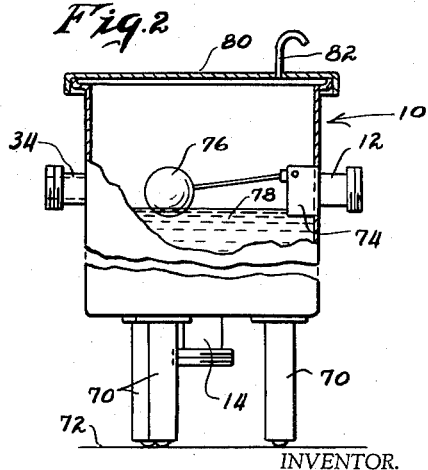
Fig. 2 is a side elevation, partly broken away and in section, of the balancing tank shown in Fig. 1.

Figure 2 shows the construction of the balancing tank 10. This tank stands on legs 70, which are merely representative of supporting means for the tank 10. The legs 70 are shown as resting on a floor 72. The flow of raw milk into the tank 10, from the inlet pipe 12, is controlled by a valve 74 operated by a float 76. The milk in the tank 10 is indicated by the reference character 78; and when the milk 78 reaches a predetermined level, the float 76 closes the valve 74.

If the supply of raw milk from the inlet pipe 12 is shut off by the valve 74, milk can still enter the balancing tank 10 through the overflow pipe 34; but this does not raise the level of the milk to any extent because the overflow into the pipe 34 can occur only when the pump is withdrawing milk from the tank 10 through the piping 14.

The tank 10 has a lid 80 with a vent outlet 82 for maintaining the interior of the tank 10, at substantially atmospheric pressure at all times. There is a flow of air from the balancing tank 10 through the overflow pipe 34 to the deaerator.

Figure 3:
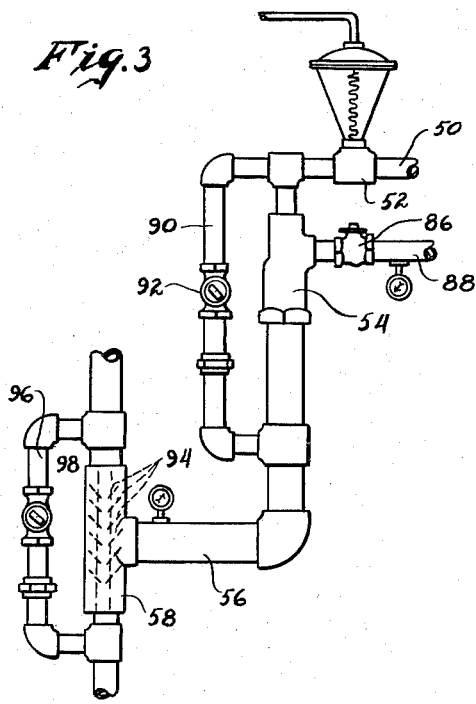
Fig. 3 is piping diagram showing a modified or more detailed connection for the system shown in Fig. 1.

Fig. 3 shows a modified construction which can be used in place of the diagrammatic steam and water connections to the vacuum jet 54 in Fig. 1. There is a check valve 86 located between the vacuum jet 54 and an outlet pipe 88 from the deaerator 28 to prevent back flow into the deaerator if the operation of the vacuum jet 54 is stopped. A by-pass 90 around the vacuum jet 54 is controlled by a valve 92. If the amount of steam needed to heat the water is more than is required to operate the vacuum jet 54, then the valve 92 is opened as much as necessary to allow this extra steam to travel through the by-pass 90.

The equipment is preferably designed so that the vacuum jet 54 will maintain the desired partial vacuum within the deaerator 28 while operating on less steam than is needed to heat the water. The by-pass 90 makes the steam supply for the hot water independent of the capacity of the vacuum jet 54.

In Fig. 3 the fitting 58 is shown enclosing a water-operated aspirator having a series of converging nozzles 94 through which water flows to draw steam from the space within the fitting 58 around the outsides of the nozzles. There is a by-pass 96 around the fitting 58 and the water aspirator enclosed in the fitting. This water by-pass 96 includes a valve 98 adjustable to determine what portion of the total water will pass through the fitting 58, and to determine the resulting suction on the steam line 56. Thus the downstream pressure on the steam-vacuum jet 54 is independent of the total water flow when the by-pass 96 is used for some of the water flow.

Figs. 4 and 5 show the construction of the deaerator 28. This unit includes a hollow shell 100 with legs 101 by which the shell is supported from a floor 102; this construction being merely representative of supporting means. There is a partition plate 104 near the top of the deaerator dividing the interior of the shell 100 into an upper liquid compartment 106 and a lower vapor chamber 110. The upper part of the shell 100 is shown as a separate section from the part below the partition plate 104 and the sections of the shell have flanges 112 clamped against gaskets 114 on opposite sides of the partition plate 104.

There are a number of openings 116 through the partition plate 104; six such openings being shown in Fig. 5. There is a tube 120, preferably made of stainless steel or other non-corrosive material, extending through each of the openings 116. A cap 122 welded or otherwise secured to the upper end of each tube 120 provides a shoulder of larger diameter than the openings 116 so that the tubes hang from the partition plate 104 with the bottom surfaces of the caps 122 resting on the plate 104 around the edges of the openings 116.

In order to permit films of milk 78 to run down the outside surfaces of the tubes 120, clearance is provided between these outside surfaces and the edges of the openings 116 in the partition plate 104. More uniform distribution of the milk flow around the circumferences of the tubes 120 is obtained for providing scallops around the circumferential edge of each of the openings 116. The milk 78 spreads over the entire outside surface of the tubes 120 and flows downwardly by gravity along each tube as a thin and quiet film. This exposes a very large surface of milk to the reduced pressure in the chamber 110 with resulting escape of air and vapors from the milk.

Milk 78 accumulates in the lower end of the chamber 110 (Figure 4), the maximum depth of accumulation being limited by the overflow pipe 34. The tubes 120 extend below the level at which the milk stands during normal operation of the deaerator so that the flow of milk down the outside of each of the tubes 120 enters the body of milk in the lower part of the deaerator quietly and without splashing. Any formation of drops which fall through the air, or any splashing or foaming of the milk, acts to restore air into the liquid.

The inside of each of the tubes 120 is vented by a pipe 126 opening through the cap 122 and extending above the milk level in the upper liquid compartment 106. The pressure in the vapor compartment 110 is substantially atmospheric at the level of the overflow pipe 34 since this pipe communicates with the balancing tank where the pressure is substantially atmospheric. The vacuum jet 54 withdraws air and vapors from the compartment 110 near the upper end of that compartment and here is a gradual reduction in the air and vapor pressure from the overflow level to the level where the air and vapor are sucked out of the deaerator by the vacuum jet 54.

In order to expose the films of milk to the partial vacuum for a substantial time, the deaerator is made tall in proportion to its diameter. Because of the fact that the pressure in the lower part of the deaerator is higher than that above, it is particularly important to avoid splashing at the low level because the milk at that level is not subjected again to partial vacuum conditions.

Fig. 6 shows a modified form of deaerator which differs from that of Figs. 4 and 5 by providing means for heating the milk during its downward flow along the tubes. The deaerator of Fig. 6 is designated by the reference character 130, but parts corresponding to those of the construction shown in Figs. 4 and 5 are indicated by the same reference characters as in those figures but with a prime appended. The upper end of the deaerator 130 is not shown in section, since it is similar to that in Fig. 4 except that there are no vent openings at the tops of the tubes 120 in the deaerator 130.

Instead of hanging freely in the vapor compartment, the tubes 120 in Fig. 6 extend into openings in a bottom partition plate 132; and the tubes fit tightly into these openings to prevent leakage of milk through this bottom partition plate 132. There is a steam chamber 134 in the deaerator 130 below the bottom partition plate 132. The lower ends of the tubes 120 are open and communicate with the steam chamber 134.

A header 136 extends around the interior of the steam chamber 134; and there are steam pipes 138 extending from the header 136 to locations near the upper ends of the tube 120. Steam discharged from the upper ends of the pipes 138 flow downwardly in the clearance between these pipes 138 and the inside surfaces of the tubes 120 to impart heat to the tubes 120, and through these tubes to the films of milk flowing down the outside surfaces of the tubes. This modification of the invention requires hollow tubes, whereas solid rods would be mechanical equivalents of the tubes in Figs. 4 and 5.

Steam exhausts from the chamber 134 through an outlet pipe 140. This steam may be used for heating water as previously described; but with the deaerator 130 equipped with means for heating the milk, this deaerator can be used in place of the milk heater 24 of Figure 1 and this eliminates the necessity for the hot water, its heater 60 and pump 62.

This invention is intended primarily for the dairy industry but it will be understood that the deaerator and the combinations herein described and claimed can be used with any liquid where problems similar to those in treating milk are presented. The preferred embodiments of the invention have been illustrated and described, but changes, and modifications can be made, and some features can be used in different combinations without departing from the invention as defined in the claims.

What is claimed is:

1. Milk treating apparatus including a deaerator for supplying milk to a homogenizer and through which the milk passes on its way to the homogenizer, the deaerator having a vapor chamber with inside walls, means for flowing heated milk down the inside walls, a liquid chamber in which liquid accumulates at the lower ends of said inside walls and into which the said inside walls extend whereby milk flows from the inside walls and into the milk accumulation in the liquid chamber without splashing, a steam-operated vacuum jet for withdrawing air and vapor from a location above the liquid chamber and along the length of the vapor chamber to create a partial vacuum in the vapor chamber of the deaerator, means for introducing steam against said walls on the sides of the walls opposite to the sides in contact with the milk to heat the milk by conduction of heat through the walls and without contact of the steam and milk, and conduits through which steam discharged from the vacuum jet is introduced into space of the deaerator on the sides of the walls opposite to the sides in contact with the milk.

2. A deaerator having a liquid compartment in the upper end thereof, a vapor chamber below the liquid compartment, a partition separating the liquid compartment and the vapor chamber from one another, the partition having an opening therethrough, a tube projecting through the partition and into the liquid compartment, said tube extending downwardly in the vapor chamber for a substantial distance, a supply passage through which liquid enters the liquid compartment, there being open space through the partition around the outside of the tube and through which liquid in the compartment flows downwardly along the outside surface of the tube through the vapor chamber, suction means that create a partial vacuum in at least the upper part of the vapor chamber, and an outlet at the lower part of the compartment for the discharge of liquid therefrom.

3. The deaerator described in claim 2, and in which there are a plurality of spaced and generally parallel tubes, and means for preventing liquid in the liquid compartment from entering the upper ends of the tube which project into the liquid compartment.

4. The deaerator described in claim 3, and in which there are caps on the upper ends of the tubes providing shoulders that contact with the partition around the edges of the partition openings through which the tubes extend, the tubes being supported from the partition by said shoulders and hanging downwardly into the vapor chamber.

5. The deaerator described in claim 3, and in which partition openings through which the tubes pass have scalloped edges providing a plurality of angularly spaced passages around each tube for the flow of liquid to distribute said liquid uniformly around the circumference of the tubes.

6. The deaerator described in claim 2, and in which there are means for determining the depth of liquid that accumulates in the bottom of the vapor chamber, and in which the tubes extend downwardly for a substantial distance below the level of the liquid in the lower part of the vapor chamber.

7. The deaerator described in claim 2, and in which the cross section of the opening through the partition is greater than that of the tube so that the space through which the liquid flows through the partition is clearance between the tube and the sides of the opening in the partition through which the tube projects.

8. The deaerator described in claim 2, and in which there is an air inlet passage for maintaining substantially atmospheric pressure at a low level of the vapor compartment, the pressure being progressively less at higher levels of the compartment up to that level at which air and vapor are withdrawn from the vapor compartment by said suction means.

9. The deaerator described in claim 2, and in which there are a plurality of tubes, and means for heating the tubes to raise the temperature of the liquid as it flows downwardly along the outside surfaces of the tubes.

10. The deaerator described in claim 9, and in which the heating means includes passages through which steam is introduced into the interior of the tubes.

11. The deaerator described in claim 9, and in which there is a steam chamber in the deaerator below the vapor chamber, and the tubes open into the steam chamber at their lower ends, the steam chamber being sealed off from the vapor chamber, a header in the steam chamber, and a pipe leading upwardly from the header into each of the tubes, each pipe having an outside diameter substantially less than the inside diameter of the tube, and each pipe extending upwardly to a location in the upper part of the tube.

References Cited in the file of this patent

UNITED STATES PATENTS

| | | |
|---|---|---|
| 2,014,580 | Murray | Sept. 17, 1935 |
| 2,023,630 | Juge | Dec. 10, 1935 |
| 2,091,606 | Murray | Aug. 31, 1937 |
| 2,559,129 | Miller | July 3, 1951 |
| 2,644,758 | Cross | July 7, 1953 |
| 2,751,031 | Smith et al. | June 19, 1956 |
| 2,816,500 | Ehrman | Dec. 17, 1957 |
| 2,846,320 | Wittwer | Aug. 5, 1958 |

FOREIGN PATENTS

| | | |
|---|---|---|
| 22,636/35 | Australia | June 15, 1936 |
| 477,327 | Italy | Jan. 20, 1937 |
| 53,151 | Denmark | May 31, 1937 |